United States Patent
Robinson et al.

(10) Patent No.: US 6,739,807 B2
(45) Date of Patent: May 25, 2004

(54) ROTATABLE CUTTING TOOL

(75) Inventors: James J. Robinson, N. Rochester Hills, MI (US); Kenneth A. Grech, Ortonville, MI (US); Larry A. Brow, Livonia, MI (US)

(73) Assignee: Valenite LLC, Madison Heights, MI (US)

( * ) Notice: Subject to any disclaimer, the term of this patent is extended or adjusted under 35 U.S.C. 154(b) by 0 days.

(21) Appl. No.: 09/995,236

(22) Filed: Nov. 26, 2001

(65) Prior Publication Data

US 2003/0099519 A1 May 29, 2003

(51) Int. Cl.7 .................. B23B 51/00; B23P 15/28
(52) U.S. Cl. .................. 407/50; 407/41; 408/83.5
(58) Field of Search .............. 407/41, 50, 110; 408/83.5

(56) References Cited

U.S. PATENT DOCUMENTS

| | | | | |
|---|---|---|---|---|
| 447,900 A | * | 3/1891 | Pallen | 407/45 |
| 534,220 A | * | 2/1895 | Kent | 407/43 |
| 602,039 A | * | 4/1898 | Smith | 407/38 |
| 867,275 A | * | 10/1907 | Hunter | 407/45 |
| 990,068 A | * | 4/1911 | Searles | 407/50 |
| 1,342,055 A | * | 6/1920 | Miller | 407/50 |
| 1,422,988 A | * | 7/1922 | Kienzl | 407/44 |
| 1,707,903 A | * | 4/1929 | Charlton | 83/845 |
| 1,960,319 A | * | 5/1934 | Severson | 408/169 |
| 2,036,656 A | | 4/1936 | Stowell et al. | |
| 2,253,028 A | | 8/1941 | Hassig | |
| 3,065,658 A | * | 11/1962 | Gross | 83/673 |
| 3,242,553 A | * | 3/1966 | Bogsten | 407/41 |
| 3,351,998 A | | 11/1967 | Theiler | |
| 3,591,305 A | * | 7/1971 | Aichhorn et al. | 408/161 |
| 3,728,940 A | * | 4/1973 | Peterson | 408/83.5 |
| 4,221,512 A | * | 9/1980 | Pool | 408/83.5 |
| 4,836,719 A | * | 6/1989 | Field | 408/1 R |
| 4,887,945 A | * | 12/1989 | Pano | 407/110 |
| 4,983,078 A | | 1/1991 | Unozawa | |
| 5,163,490 A | * | 11/1992 | Meis | 144/230 |
| 5,267,817 A | * | 12/1993 | Englund | 407/110 |
| 5,516,241 A | * | 5/1996 | Plutschuck et al. | 407/110 |
| 5,620,284 A | | 4/1997 | Ueda et al. | |
| 5,704,741 A | | 1/1998 | Cirino | |
| 5,820,309 A | * | 10/1998 | Mihic | 407/50 |
| 5,839,859 A | | 11/1998 | Shimomura et al. | |

* cited by examiner

*Primary Examiner*—A. L. Wellington
*Assistant Examiner*—Brian D. Walsh
(74) *Attorney, Agent, or Firm*—Burns, Doane, Swecker & Mathis, LLP

(57) ABSTRACT

A rotatable cutting tool comprising a cutting tool body having at least one recess for receiving a replaceable insert. The recess has a wall defined by a deformable clamp extending radially from the tool body, the clamp comprising a leaf isolated from the tool body except at the base of the leaf by an isolating channel in the tool body. The tool further comprising adjustable clamping means for elastically deforming the leaf to retain a replaceable insert in the recess.

11 Claims, 3 Drawing Sheets

ROTATABLE CUTTING TOOL

BACKGROUND OF THE INVENTION

I. Field of the Invention

This invention relates to rotatable cutting tools, particularly tools having replaceable cutting blades or inserts releasably retained by clamping means in the tool body.

II. Description of Related Art

It is known to provide rotatable cutting tools comprising a tool body and one or more replaceable blades or inserts for machining operations. An insert for these tools comprises a cutting element made of a relatively long wearing material chosen for compatibility with the material to be cut and comprising one or more cutting edges. An insert may further comprise a holder for mounting the cutting element to the tool body. A tool body for such tools comprises at least one recess for receiving a replaceable insert and the tool further comprises means for releasably retaining the inserts on the tool body. Tools of this type include drilling tools, boring tools, reaming tools and milling tools.

A particular type of rotatable tool is a tool for machining valve seats in cylinder heads of internal combustion engines, the tool having cutting inserts arrayed on the periphery of the tool and having a reaming tool for machining the valve stem guide bore. As the number of valves per cylinder have increased and overall engine dimensions have decreased, valve diameters have decreased. Consequently tools for performing valve seat machining operations are required to retain cutting blades or inserts in tool bodies having reduced diameters. Known tools for such applications, such as disclosed in U.S. Pat. No. 5,704,741, have included exchangeable cartridges for retaining replaceable cutting inserts. With the demand for smaller diameter valves, smaller diameter tools are required, reducing the tool body volume that can be consumed with blade retaining devices.

FIGS. 1a and 1b illustrate one known tool wherein the replaceable blades are retained in recesses in the tool body by clamping screws. In FIG. 1a, replaceable blades 112 and 114 are retained in recesses of tool body 110. As shown with respect to replaceable blade 112, clamping screws 116 are transverse to recess 118 (FIG. 1b) and are threadably engaged with tool body 110. With replaceable blade 112 in place in recess 118, advance of clamping screws 116 into tool body 110 clamps blade 112 (shown dashed in FIG. 1b) against a side wall of recess 118. As shown in FIG. 1a, plural screws are used and are spaced apart to distribute the clamping forces over the length of the blade to improve resistance of the blade to displacement from cutting forces and from distortion from clamping forces.

FIGS. 1c and 1d illustrate an alternative known clamping arrangement for retaining replaceable tools in a tool body. In FIG. 1c, replaceable blades 122 and 124 are retained in recesses of tool body 120. As shown with respect to replaceable blade 122, wedges 128 are held in recesses 130 adjacent blade receiving recess 132 (FIG. 1d) by screws 126. Screws 126 are threadably engaged with tool body 120. With replaceable blade 122 in place in recess 132, advance of screws 126 into tool body 120 advances the forward edges of wedges 128 to clamp blade 122 (shown dashed in FIG. 1d) against a sidewall of recess 132. Each of wedges 128 serves to distribute the forces from each of screws 126 over larger portions of blade 122 than would be done by the screws alone as in the arrangement of FIG. 1a. However, while larger wedges would provide improved distribution of forces, large wedge receiving recesses, such as recesses 130 are not desirable because of the attendant weakening of the tool body.

In light of the shortcomings of the known clamping means as illustrated in FIGS. 1a and 1c, there remains a need for improved clamping means for replaceable blades in rotating tools.

SUMMARY OF THE INVENTION

It is an object of the present invention to provide a rotatable cutting tool body for releasable retention of at least one replaceable cutting blade wherein the tool body includes an elastically deformable clamp for each such blade, the clamp operable to apply a clamping force to a blade to releasably retain the blade in the tool body.

It is a further object of the present invention to provide a rotatable cutting tool body for releasable retention of at least one replaceable cutting blade wherein the tool body includes an elastically deformable clamp for each such blade, the clamp being operable to apply a clamping force to releasably retain a blade and comprising a leaf integral with the body and a clamping means for deforming the leaf.

It is a still further object of the present invention to provide a rotatable cutting tool having at least one replaceable cuffing blade releasably retained thereon wherein the tool body includes an elastically deformable clamp for each such blade, the clamp being operable to apply a clamping force to releasably retain a blade.

It is a still further object of the present invention to provide a rotatable cutting tool having at least one replaceable cutting blade releasably retained thereon wherein the tool body includes an elastically deformable clamp for each such blade, the clamp being operable to apply a clamping force to releasably retain a blade and comprising a leaf integral with the body and a clamping means for deforming the leaf.

Further objects and advantages of the invention shall be made apparent from the accompanying drawings and the following description thereof.

In accordance with the aforesaid objects the present invention provides a rotatable cutting tool comprising a cutting tool body having at least one recess for receiving a replaceable insert. The recess has a wall defined by a deformable leaf isolated from the tool body except at the base of the leaf by an isolating channel in the tool body. The tool further comprising adjustable clamping means for elastically deforming the leaf to releasably retain a replaceable insert in the recess.

DETAILED DESCRIPTION OF THE PREFERRED EMBODIMENT

Cutting tools according to the invention shall be described with reference to the figures, illustrating particular types of tools. While the invention is advantageous as applied to such tools, it is suitable for application to other rotatable cutting tools releasably retaining replaceable cutting blades or inserts. As used herein, the term replaceable inserts shall include blades, inserts, and insert cartridges for carrying inserts.

Figure 1A:
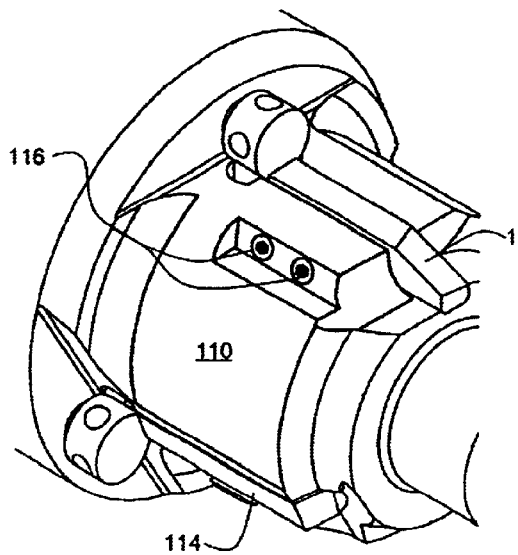
FIGS. 1a–1d depict known rotatable cutting tool with replaceable blades
Figure 1C:
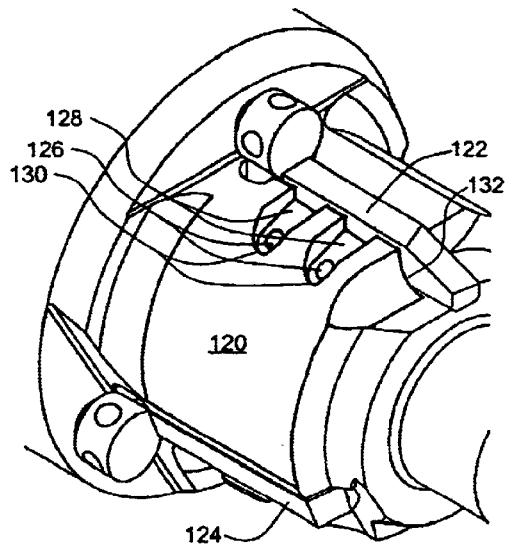
Figure 1B:
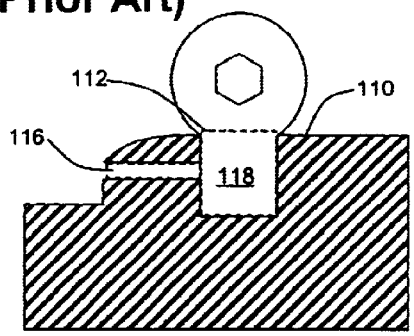
Figure 1D:
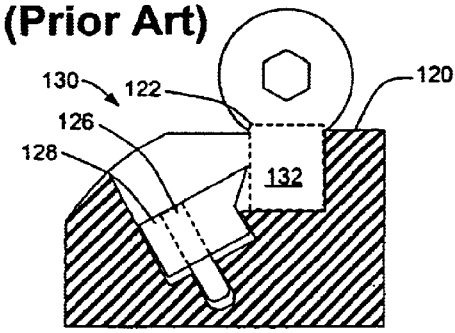
Figure 2:
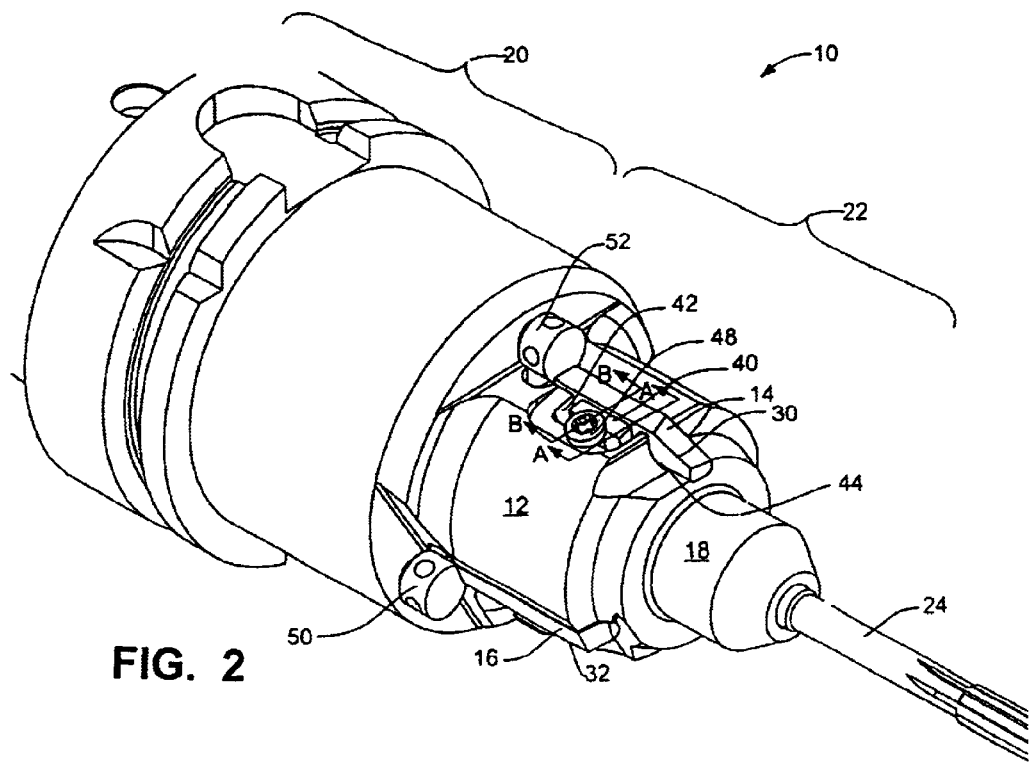
FIG. 2 is an isometric view of a first rotatable cutting tool in accordance with the invention.

FIG. 2 depicts a cutting tool for machining valve seats of cylinder heads of internal combustion engines. Cutting tool 10 has a tool body 12 comprising a shank portion 20 (shown only partially) and a cutting portion 22. Typical of such tools, cutting portion 22 is fitted with three blades such as blades 14 and 16 having cutting edges 30 and 32 for machining, at least, portions of valve seat surfaces. In addition, a reamer 24 (shown only partially in FIG. 2) is supported by nose portion 18 along an axis of rotation of the tool body 12 to provide cutting edges for machining a valve stem guide bore. Shank portion 20 includes elements for mounting tool body 12 to a tool driving device such as a machine spindle, or for mounting tool body 12 to a tool coupling device for mounting to a tool driving device, as is well known. Cutting portion 22 comprises recesses (recess 44 in FIGS. 3a, 3b) in which are received replaceable inserts or blades such as blades 14 and 16. Blades 14 and 16 abut depth adjusting stops 50 and 52, each stop being adjustable to set the stand-off distance of an abutting surface of a blade from a reference plane (not shown) on tool body 12. The abutting surface of a blade may be flat and be formed in a portion of the end of, or a shoulder on, the blade. Suitable stops, such as stops 50 and 52, are well known, such as, for example, flat headed screw engaging threaded holes in tool body 12, and studs mounted to tool body 12 with head members, wherein the stud and/or the head member are adjustable to position the blade abutting surface relative to tool body 12.

Figure 3A:
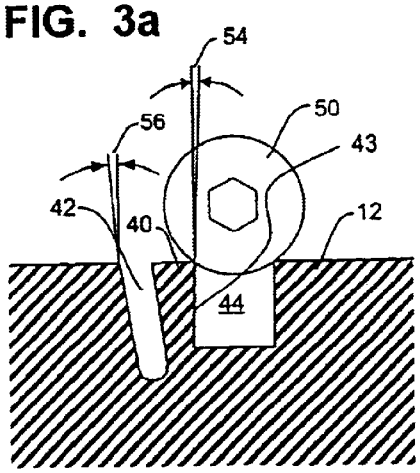
FIGS. 3a and 3b are enlarged sectional views taken along the lines A—A and B—B of FIG. 2.
Figure 3B:
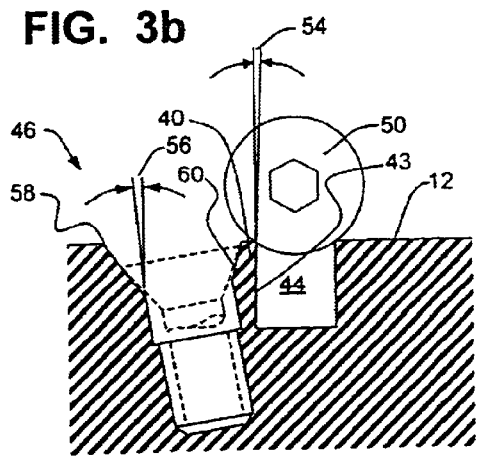

Referring to FIGS. 2, 3a and 3b, an elastically deformable leaf 40 is created within tool body 12 by groove 42 and recess 44. Groove 42 defines a gap between leaf 40 and the bulk of tool body 12 so that together with recess 44, leaf 40 extends radially from tool body 12 and is isolated therefrom except at its base. Threaded hole 46 (FIG. 3b) is formed in tool body 12 near the longitudinal center of leaf 40 and straddling groove 42. Threaded hole 46 receives clamping screw 48 (FIG. 2), a taper headed screw (taper shown dashed in FIG. 3b). Chamfers 58 and 60 at the entry of hole 46 are formed in leaf 40 and tool body 12, respectively. To provide a "self locking" capability, the angle of chamfers 58 and 60 is made slightly steeper than the taper of the head of screw 48. The diameter in the chamfered portion of hole 46 below the entry is less than the diameter of the head of screw 48. As the head of screw 48 is advanced down chamfers 58 and 60, leaf 40 is elastically deformed, that is, bent, toward recess 44. To insure bending is allowed near the top of leaf 40, wall 43 is inclined at a shallow clearance angle 54 ensuring the gap between leaf 40 and a blade is wider at the base of leaf 40 than near its top. With a blade in place in recess 44, advance of screw 48 into tool body 12 bends leaf 40 against the blade, narrowing the width of recess 44 and eliminating the gap between leaf 40 and the blade at least at the top of leaf 40. Once contact is made between leaf 40 and the blade, the blade is seated against the sidewall of recess 44 and further advance of screw 48 builds compressive force through leaf 40 against the blade.

Continuing with reference to FIGS. 2, 3a and 3b, threaded bore 46 and groove 42 are inclined at a shallow angle 56 toward the base of leaf 40. This inclination narrows the cross section of tool body 12 at the base of leaf 40 reducing resistance to bending of leaf 40 about its base.

Figure 4:
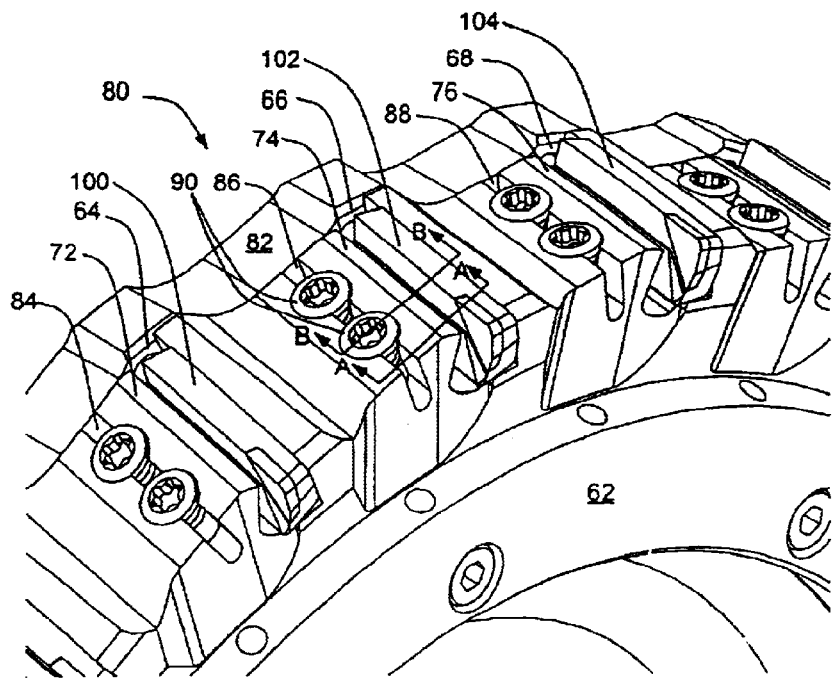
FIG. 4 is an isometric view of a segment of a second rotatable cutting tool in accordance with the invention.

FIG. 4 depicts a segment of a milling cutter, such as a face milling cutter, wherein replaceable blades or inserts are retained on the periphery of a tool body so as to expose at least one cutting edge on each such blade or insert. It is to be understood that the segment of FIG. 4 comprises a cutting portion 80 of a complete cutting tool. Cutting portion 80 comprises insert retention disk 62 and base 82, which is mounted to or comprises a shank portion of the tool for mounting to a tool driving device. Retention disk 62 includes recesses on the periphery, such as recesses 6468 for receiving replaceable blades or inserts, such as inserts 100–104 or blade or insert cartridges, that is members providing seating surfaces for and to which are mounted replaceable blades or inserts. Each recess is bounded on one side by a deformable leaf, such as leaves 72–76 and intersects the front and back of retention disk 62. Each deformable leaf extends radially from retention disk 62 adjacent an insert receiving recess and is otherwise isolated from retention disk 62 so as to be free to bend into its adjacent insert receiving recess. Base 82 closes the rear end of recesses 64–68, and advantageously, provides adjusting means (not shown) for each insert at the closed end of each of recesses 64–68 to set the stand-off distance of an abutting surface of each insert from base 82.

Figure 5A:
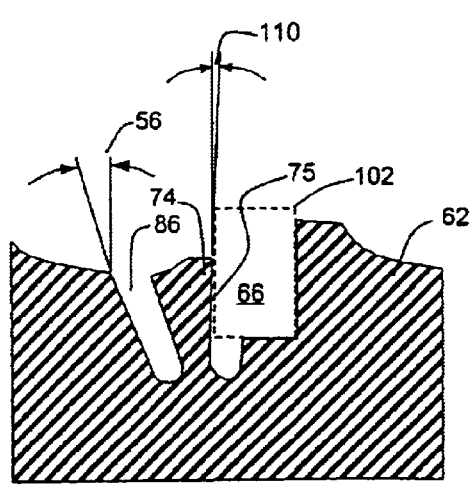
FIGS. 5a and 5b are enlarged sectional views taken along the lines A—A and B—B of FIG. 4.
Figure 5B:
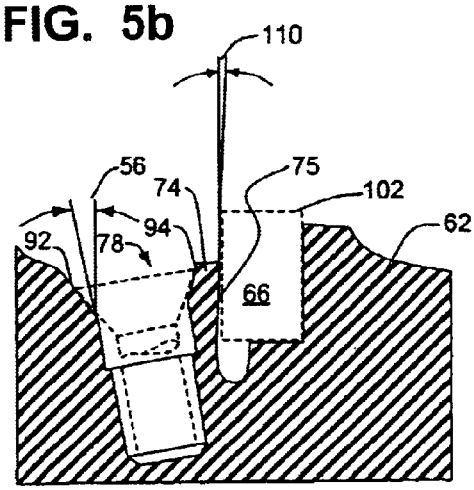

Referring to FIGS. 5a and 5b, each leaf, as illustrated by leaf 74, is defined by a slot through retention disk 62, such as slot 86, and an insert receiving recess, such as recess 66. Slot 84 and recess 64 define leaf 72; and, slot 88 and recess 68 define leaf 76. At least one threaded hole is formed in retention disk 62 to straddle each slot, the upper portion of each hole receiving the head end of a clamping screw threadably engaged in the hole. As shown in FIG. 4, two screws are associated with each slot, such as screws 90 in slot 86. Threaded hole 78 (FIG. 5b) receives a clamping screw, such as clamping screw 90 (FIG. 4), which has a tapered head (shown dashed in FIG. 5b). Chamfers 92 and 94 at the entry of hole 78 are formed in leaf 74 and retention disk 62 respectively. To provide a "self locking" capability, the angle of chamfers 92 and 94 are made slightly steeper than the taper of the head of screw 90. The diameter in the chamfered portion of hole 78 below the entry is less than the diameter of the head of screw 90. As the head of screw 90 is advanced down chamfers 92 and 94, leaf 74 is elastically deformed, that is, bent, toward recess 66. To insure bending is allowed near the top of leaf 74, wall 75 is inclined at a shallow clearance angle 110 ensuring that the gap between leaf 74 and a blade or insert is wider at the base of leaf 74 than near its top. With blade 102 (shown dashed in FIGS. 5a and 5b) in place in recess 66, advance of screws 90 into retention disk 62 bends leaf 74 against blade 102, narrowing the width of recess 66 and eliminating the gap between leaf 74 and the blade at least at the top of leaf 74. Once contact is made between leaf 74 and the blade is seated against the sidewall of recess 66, further advance of screws 90 builds compressive force through leaf 74 against blade 102.

Considering the tools of FIGS. 2 and 4, common features of the invention include: a tool body having at least one recess for receiving a replaceable insert; at least one deformable leaf defining a wall of such recess, such as leaf 40 and leaf 74; isolating channels that serve to isolate a deformable leaf from the tool body except at the base of the leaf, such as groove 42 and slot 86; adjustable clamping means, such as tapered screw 46 acting on chamfers 58 and 60 and tapered screws 90 acting on chamfers 92 and 94. While the adjustable clamping means advantageously include a combination of the taper of the clamp screw head and chamfers in the tool body and leaf, other arrangement may be used. For example, a taper-headed screw may be used with a single chamfer on the leaf. Alternatively, a cylindrically headed adjusting screw may be combined with a separate wedge member wherein the adjusting screw sets the depth of the wedge member between the tool body and a leaf.

While the invention has been disclosed with reference to particular cutting tools as illustrated in the accompanying drawings, it is not the intention of applicant to limit the invention to the particulars of such tools. Rather, it is the intention of the applicant that the invention be defined by the appended claims and all equivalents thereof.

What is claimed is:

1. A rotatable cutting tool for releasably retaining at least one replaceable insert for machining valve seats of cylinder heads of internal combustion engines, the insert being retained in the tool to expose a cutting edge of the insert, the tool comprising a tool body defining an axis of rotation and including a nose portion in which a reamer is mounted to project forwardly along the axis for machining a valve stem guide bore, the tool body having at least one recess for receiving the replaceable insert, an elastically deformable clamp extending radially from the tool body and defining one wall of an insert receiving recess and an adjustable clamping means for deforming the clamp to releasably retain the replaceable insert in the recess, the elastically deformable clamp comprising a leaf, the leaf being defined by the insert receiving recess and an isolating channel isolating the leaf from the tool body except at the base of the leaf, the leaf extending axially for a shorter distance than the insert wherein opposite front and rear axial end portions of the insert project axially past the leaf, the insert being adjustable in a direction parallel to the axis, and an adjustable stop arranged to engage the axial rear end portion of the insert for defining an axially adjusted position of a front portion of the cutting edge that extends axially forwardly past the recess.

2. The rotatable cutting tool of claim 1, wherein the isolating channel is inclined at a shallow angle to narrow the width of the cross section of the tool body at the base of the leaf.

3. The rotatable cutting tool of claim 1, wherein the adjustable clamping means further comprises at least one taper headed screw engaging a threaded hole formed through a floor of the isolating channel, and a diameter of the screw head being larger than the gap between the leaf and the tool body.

4. The rotatable cutting tool of claim 3 wherein the adjustable clamping means further comprises a chamfer on at least the leaf at the entry of the threaded hole.

5. The rotatable cutting tool of claim 4 wherein the angle of inclination of the chamfer is steeper than the taper of the screw head.

6. The cutting tool of claim 4 wherein the isolating channel is inclined at a shallow angle to narrow the cross section of the tool body at the base of the deformable leaf.

7. The cutting tool of claim 4 wherein the wall of the recess defined by the leaf is inclined at a shallow angle to establish clearance between the wall and a replaceable insert proximate the base of the leaf.

8. The rotatable cutting tool of claim 3, wherein the isolating channel is inclined at a shallow angle to narrow the cross section of the tool body at the base of the leaf.

9. The cutting tool of claim 3 wherein the wall of the recess defined by the leaf is inclined at a shallow angle to establish clearance between the wall and a replaceable insert proximate the base of the leaf.

10. A rotatable cutting tool for releasably retaining at least one replaceable insert, the insert being retained in the tool to expose a cutting edge of the insert, the tool comprising a tool body having at least one recess for receiving the replaceable insert, an elastically deformable clamp extending radially from the tool body and defining one wall of an insert receiving recess, and an adjustable clamping means for deforming the clamp to releasably retain the replaceable insert in the recess, the elastically deformable clamp comprising a leaf, the leaf being defined by the insert receiving recess and an isolating channel isolating the leaf from the tool body except at the base of the leaf, the adjustable clamping means comprising at least one taper headed screw engaging a threaded hole formed through a floor of the isolating channel, and a diameter of the screw head being larger than the gap between the leaf and the tool body, the adjustable clamping means further comprising a chamfer on at least the leaf at the entry of the threaded hole, wherein the angle of inclination of the chamfer is steeper than the taper of the screw head.

11. A tool body for a rotatable cutting tool, the tool body comprising at least one recess for receiving a replaceable insert, an elastically deformable clamp extending radially from the tool body and defining one wall of an insert receiving recess and an adjustable clamping means for deforming the clamp, the elastically deformable clamp comprising a leaf, the leaf being defined by the insert receiving recess and an isolating channel isolating the leaf from the tool body except at the base of the leaf, the adjustable clamping means comprising at least one taper headed screw engaging a threaded hole formed through a floor of the isolating channel, and a diameter of the screw head being larger than the gap between the leaf and the tool body, the adjustable clamping means further comprising a chamfer on at least the leaf at the entry of the threaded hole, wherein the angle of inclination of the chamfer is steeper than the taper of the screw head.

* * * * *